(12) United States Patent
Tada et al.

(10) Patent No.: US 7,922,611 B2
(45) Date of Patent: Apr. 12, 2011

(54) POWER TRANSMISSION SYSTEM

(75) Inventors: Yoshiki Tada, Okazaki (JP); Michiyasu Nosaka, Anjo (JP); Yasuo Tabuchi, Toyoake (JP); Takushi Kamiya, Nukata-gun (JP); Takayuki Suzuki, Hekinan (JP)

(73) Assignee: DENSO CORPORATION, Kariya (JP)

( * ) Notice: Subject to any disclaimer, the term of this patent is extended or adjusted under 35 U.S.C. 154(b) by 125 days.

(21) Appl. No.: 11/798,515

(22) Filed: May 15, 2007

(65) Prior Publication Data
US 2007/0270257 A1 Nov. 22, 2007

(30) Foreign Application Priority Data

May 19, 2006 (JP) ................................. 2006-140729

(51) Int. Cl.
*F16D 9/00* (2006.01)
*F16H 9/00* (2006.01)
(52) U.S. Cl. .............................. 474/70; 464/32; 474/902
(58) Field of Classification Search .................... 464/75, 464/30, 32, 33, 35; 474/70, 199, 902
See application file for complete search history.

(56) References Cited

U.S. PATENT DOCUMENTS

| 1,125,739 | A | * | 1/1915 | Schneider | 464/37 |
| 2,106,638 | A | * | 1/1938 | Hillier | 137/223 |
| 2,232,637 | A | * | 2/1941 | Schmitter | 464/28 |
| 2,828,616 | A | * | 4/1958 | Zeigler et al. | 464/75 |
| 3,257,860 | A | * | 6/1966 | Runde et al. | 474/94 |
| 3,785,217 | A | * | 1/1974 | Peura | 474/190 |
| 4,078,445 | A | * | 3/1978 | Kiser, Jr. | 474/150 |
| 4,722,722 | A | * | 2/1988 | Rampe | 474/161 |
| 6,332,842 | B1 | | 12/2001 | Tabuchi et al. | |
| 6,722,993 | B2 | * | 4/2004 | Tabuchi et al. | 464/34 |
| 2002/0049089 | A1 | | 4/2002 | Tabuchi et al. | |
| 2004/0198499 | A1 | * | 10/2004 | Kamdem et al. | 464/75 |
| 2005/0261093 | A1 | * | 11/2005 | Shimizu et al. | 474/70 |
| 2006/0084541 | A1 | | 4/2006 | Nosaka et al. | |
| 2006/0089201 | A1 | * | 4/2006 | Nosaka et al. | 464/30 |
| 2006/0270498 | A1 | * | 11/2006 | Kanou et al. | 474/70 |
| 2007/0093326 | A1 | | 4/2007 | Nosaka | |
| 2009/0258741 | A1 | | 10/2009 | Nosaka et al. | |

FOREIGN PATENT DOCUMENTS

| DE | 10152 104 A1 | 6/2002 |
| DE | 10 2005 049832 A1 | 5/2006 |
| JP | A-2002-364667 | 12/2002 |
| JP | 2007-113763 A | 5/2007 |

OTHER PUBLICATIONS

German Office Action issued from the German Patent Office on Nov. 4, 2010 in the corresponding German patent application No. 10 2007 023 036.4 (a copy and English translation thereof).

* cited by examiner

*Primary Examiner* — Robert A Siconolfi
*Assistant Examiner* — Stephen Bowes
(74) *Attorney, Agent, or Firm* — Posz Law Group, PLC

(57) ABSTRACT

A power transmission system including an integrally molded hub and elastic member, where stress is inhibited from concentrating at the gate marks remaining after integral molding. In a pulley driven by a belt, a plastic pulley side relief section 1a provided at a pocket section of the pulley and a plastic hub side relief section provided on an iron outer ring of the hub engaged at the pocket section whereby power is transmitted from the pulley to the shaft. The hub side relief section and outer ring forming parts of the hub, the iron inner hub to be fastened to the shaft, and the plastic cylindrical part are integrally molded so that the gate mark for plastic injection is formed near to or further to the outer circumference of the outer ring.

9 Claims, 5 Drawing Sheets

POWER TRANSMISSION SYSTEM

BACKGROUND OF THE INVENTION

1. Field of the Invention

The present invention relates to a power transmission system having a torque transmission elastic member, specifically relates to a power transmission system suitable for being built into a compressor of a vehicular air-conditioning system.

2. Description of the Related Art

For example, in a vehicular air-conditioning system, as a power transmission system transmitting power from an engine, motor, or other external power source to a compressor forming part of a refrigeration cycle, a power transmission system not having an electromagnetic clutch mechanism, but having a torque limiter is being used. This power transmission system transmits power between a pulley driven by an external power source and a hub fixed to a shaft of the compressor. The hub is provided with a rubber or other damper attenuation mechanism and is arranged coaxially with a pulley. In the past, the pulley and hub were fastened together using insert hardware and bolts, but in recent years, a power transmission system has been proposed which makes the pulley out of plastic, forms a projection at the outside ring of the hub, forms a recess at the inner circumference of the plastic pulley, and fits these together and therefore does not require any bolts for engagement of the hub and pulley (see Japanese Patent Publication (A) No. 2002-3646671).

However, in the prior art, there was the problem that excess torque or torque fluctuations caused the projection of the outside ring of the hub and recess of the pulley to directly contact and caused the recess of the plastic pulley, which is inferior to the projection of the outside ring in strength and abrasion resistance, to end up being abnormally abraded.

The assignee proposed a power transmission system for dealing with this problem provided with a hub comprised of a pulley, inner hub, outer hub, and torque transmission elastic member and engaging hub engagement parts comprised of an elastic material provided at the inner circumference, outer circumference, or inner and outer circumferences of the outer hub and a pulley side engagement part provided at a position of the pulley corresponding to the outer hub so as to form a torque transmission structure of a hub and pulley (Japanese Patent Application No. 2005-69316). Due to this, no bolts or insert hardware is required and higher strength attachment of the pulley and hub can be obtained.

In the proposed power transmission system, the torque transmission elastic member and hub side engagement part are preferably integrally molded with the hub. In this case, for example when integrally molding a plastic elastic member and a metal hub, normally a plurality of injection gates are arranged near the center of the location for forming the elastic member forming the cylindrical part between the inner hub and outer hub and these gates are used to inject the material of the elastic member. However, the bases of the gate marks remaining after integral molding have small radii of curvature. If a load susceptible to torque fluctuations is received frequently over a long time, stress concentrates near the gate marks possibly leading to deformation or even breakage.

SUMMARY OF THE INVENTION

An object of the present invention, in view of this problem, is to provide a power transmission system in which a hub and a torque transmission elastic member are integrally molded where the gate marks remaining after integral molding are shaped to prevent stress concentration and where more superior durability is achieved.

The present invention achieves the above object by provision of the following power transmission system. That is, it provides a power transmission system provides with a pulley (1) rotatably attached to a casing (4) and a hub (2) provided at a front end of a shaft (3) projecting to the outside from the casing (4) and rotating integrally with the shaft and transmitting power from the pulley (1) to the shaft (3), wherein the hub (2) is comprised of an inner hub (2c) fastened to the shaft (3), an outer ring (2b) arranged at an outer circumference side from the inner hub (2c), and a torque transmission elastic member (2d, 2a) integrally molded together with the inner hub (2c), and the outer ring (2b) and a gate mark (2f, 2g, 2h) consisting of a mark of an injection gate used for the integral molding is formed at the position of the outer ring (2b) or at the outer circumference side from the outer ring (2b). Due to this, it is possible to ease the stress concentration at the gate mark.

Preferably, the torque transmission elastic member (2d, 2a) is comprised of a cylindrical part (2d) between the inner hub (2c) and the outer ring (2b) and a hub side relief section (2a) provided at the outer circumference of the outer ring (2b), and the pulley (1) has a pulley side relief section (1a) engaging with the hub side relief section (2a). Due to this, it is possible to relieve the stress concentration at the gate mark formed at the hub in a power transmission system where the hub and pulley are engaged.

Preferably, the gate mark (2f) is formed at the end of the outer ring (2b). Therefore, the radius of curvature of the base of the gate mark can be made larger. Further, since the gate mark is formed near the outer ring, the resistance to stress increases.

Preferably, the gate mark (2g) is formed at the outer circumference of the outer ring (2b). Since the gate mark is formed near the outer ring, the resistance to stress increases.

Preferably, the gate mark (2h) is formed at the side surface of the hub side relief section (2a). Since the gate mark is formed at the outer circumference of the hub, the stress on the gate mark can be reduced.

Preferably, the system is further provided with a torque limiter (9) engaged with the shaft (3) and blocking transmission of excessive torque between the pulley (1) and the shaft (3). Note that the reference numerals in the parentheses following the above means show the correspondence with the specific means described in the embodiments explained later.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
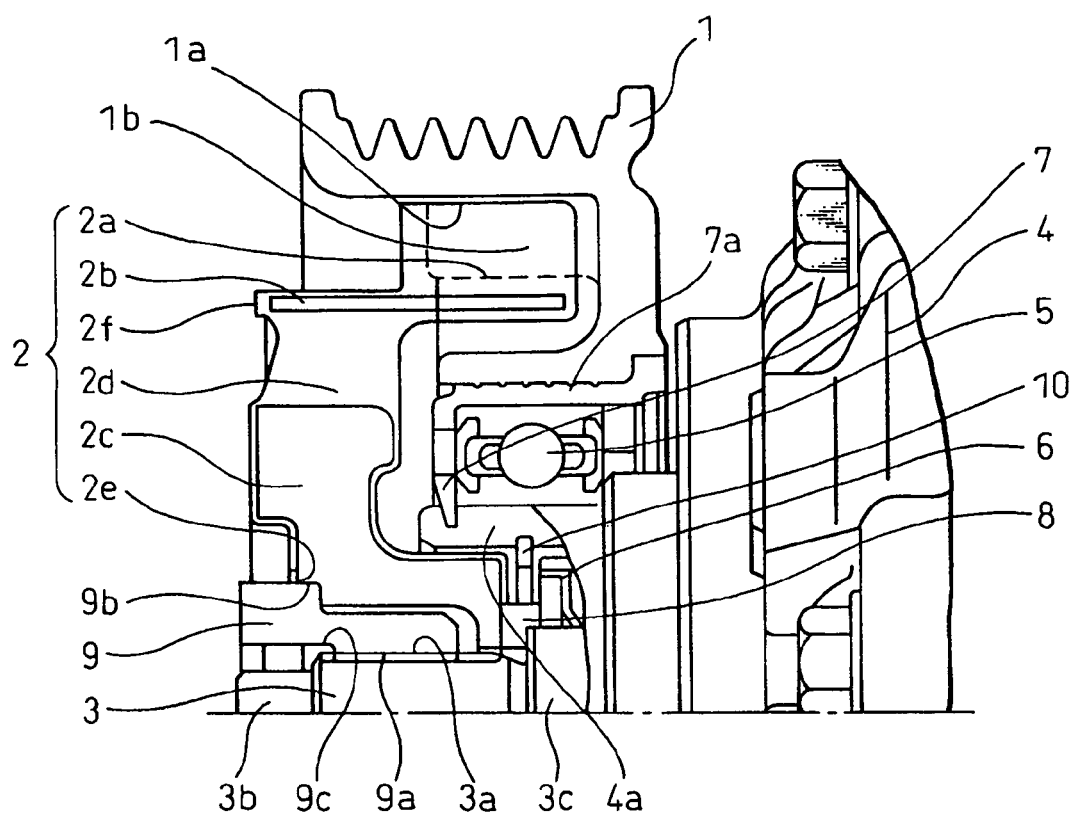
FIG. 1 is a view showing the cross-section of the top half of a power transmission system according to a first embodiment of the present invention.
Figure 2:
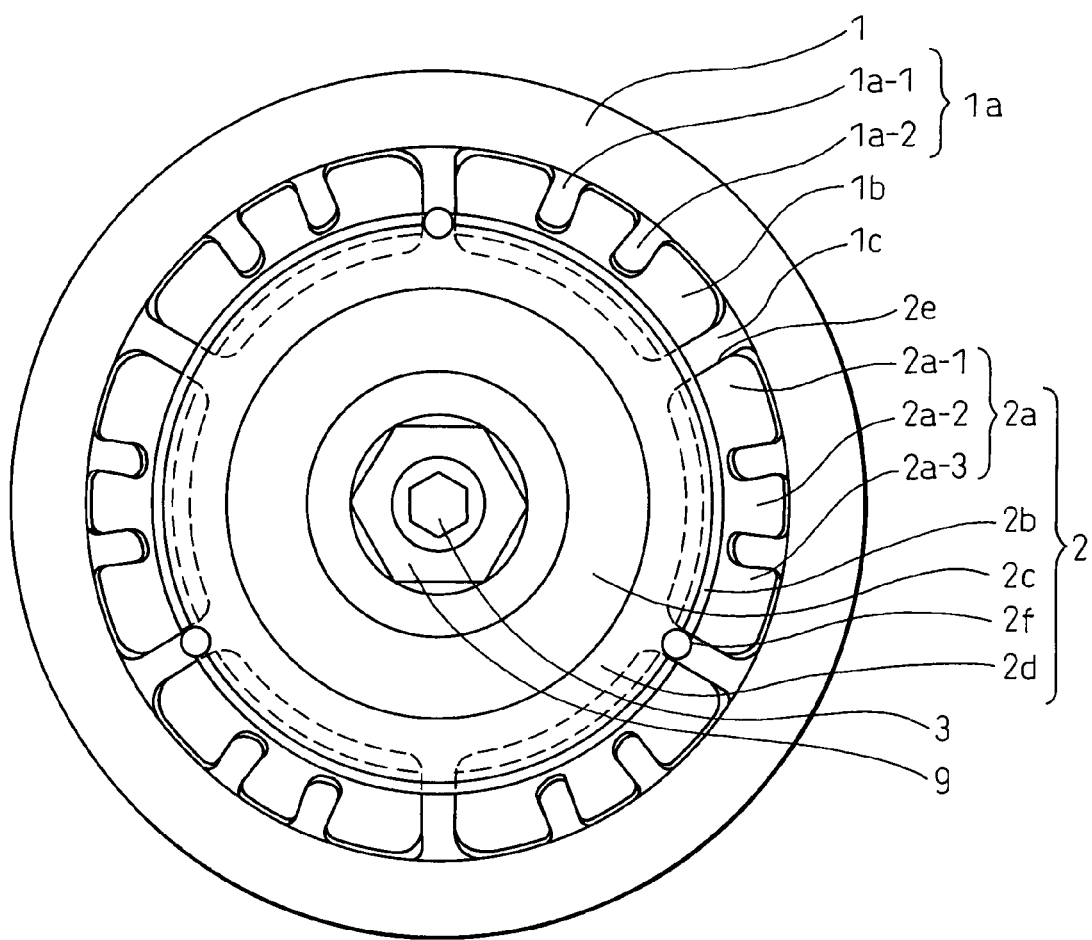
FIG. 2 is a front view of a power transmission system of a first embodiment.

Below, power transmission systems according to embodiments of the present invention will be explained with reference to the drawings. The power transmission systems according to these embodiments are suitable for being built into compressors of vehicular air-conditioning systems. FIG. 1 is a view showing the cross-section of the top half of a power transmission system according to a first embodiment of the present invention, while FIG. 2 is a front view of a power transmission system of a first embodiment. The power transmission system of this embodiment transmits power (torque) between a pulley 1 as a drive side rotational member obtaining power from an engine or motor and a hub 2 as a driven side rotational member fastened to a shaft 3 of a compressor. The pulley 1 and hub 2 are provided coaxially.

The pulley 1 is rotatably mounted to a cylindrical boss 4a provided at one end of a casing 4 of the compressor through a bearing 5 and a first snap ring 7 provided with a sleeve ring 7a made of iron or another metal material. The pulley 1 is preferably formed by a thermoplastic plastic and is formed integrally with the bearing 5 and the first snap ring 7 with the sleeve ring 7a by insert molding.

A belt (not shown) is wound around the outer circumference of the pulley 1. The pulley 1 rotates by power from an engine, motor, or other outside power source transmitted by the belt. The bearing 5 engages with the boss 4a and is inhibited from movement in the axial direction by the first snap ring 7 with the sleeve ring 7a being fit between the end of the boss 4a and the groove formed in the outer circumference of the boss 4a.

The front end of the shaft 3 of the compressor projects out from the casing 4. From its tip, the front end of the shaft 3 is comprised of a tool shaped part 3b formed into a tool shape, a male thread 3a formed at the outer circumference, and a shaft 3c with a larger diameter than the male thread 3a. A step is formed between the male thread 3a and the shaft 3c to form a seat face of a washer 8. The washer 8 has an L-sectional shape and is placed to be clamped between the hub side seat face formed by the rear side front end face of the later explained inner hub 2c and the seat face (step) of the shaft 3c.

The casing 4 and the shaft 3 are tightly sealed by an axial seal 6 which prevents refrigerant, oil, etc. in the compressor from leaking to the outside. This axial seal 6 is also inhibited from movement in the axial direction by a second snap ring 10 fit in a groove formed in the inner circumference of the boss 4a.

A torque limiter 9 is fastened screwed over the male thread 3a of the shaft 3. The torque limiter 9 has a polygonal or circular cylindrical shape comprised of a large outside diameter part with a large outside diameter and a small outside diameter part with a small outside diameter. An outer circumference engagement part 9b of the torque limiter is fastened by press-fitting etc. to an engagement part 2e of an inner hub 2b forming part of the later explained hub 2. The inner circumference of the small outside diameter part is formed with a female thread 9a which is screwed with the male thread 3a of the shaft 3. The inside diameter of the large outside diameter part is somewhat larger than the inside diameter of the small outside diameter part. The transition part of the inner circumferences of the two is formed with a breakaway part 9c provided with a notch. Therefore, this is designed so that when the torque limiter 9 receives an excessive axial force, the breakaway part 9c easily breaks.

The hub 2 is comprised of an inner hub 2c, a cylindrical part 2d comprised of an elastic member, an outer ring 2b, and a hub side relief section 2a comprised of an elastic member. The inner hub 2c is formed by iron or another metal material and forms a substantially cylindrical shape.

The inner circumference of the inner hub 2c is formed into a shape matching with the outer circumference engagement part 9b of the torque limiter 9 as the inner hub engagement part 2e. The inner hub 2c and torque limiter 9 are fastened by press-fitting or another means. As the connection method, the inner hub engagement part 2e may be formed into the same polygonal shape as the outer circumference engagement part 9b of the torque limiter 9 and the two members may be fastened by engagement or the two members may be screwed together like with the connection of the shaft 3 and the torque limiter 9. Further, the rear side front end face of the inner hub 2c forms the hub side seat face. By abutting against the washer 8, the inner hub 2c is clamped between the torque limiter 9 and the washer 8.

The outer ring 2b is substantially cylindrical in shape and is formed from iron or another metal material in the same way as the inner hub 2c.

The cylindrical part 2d is formed from rubber or a plastic or other elastic member and is held between the inner hub 2c and outer ring 2b. Further, the cylindrical part 2d is formed integrally by insert molding along with the later explained hub side relief section 2a so as to be joined with the outer circumference of the inner hub 2c and the inner circumference of the outer ring 2b. In this case, preferably the entire surface of the outer ring 2b is covered by an elastic member (cylindrical part 2d and hub side relief section 2a). The elastic member of the cylindrical part 2c not only functions for torque transmission, but also functions as a torque damper.

The top surface of the outer ring 2b is provided with a hub side relief section 2a comprised of an elastic member similar to the cylindrical part 2d. The hub side relief section 2a is a ring shaped one with relief shapes along the circumferential direction. As shown in FIG. 2, in the present embodiment, relief shapes are formed along the entire circumference of the top surface of the outer ring 2b. Specifically, on the circumference divided by the slits 2e, three projecting parts 2a-1 to 2a-3 and two recessed parts between them are formed. The hub side relief section 2a is engaged with the pulley side relief section 1a of the later explained pulley 1. Six slits 2e are fit with reinforcing ribs 1c of the pulley 1.

On the other hand, at the pulley 1 as well, the end face of the front side is formed with a pocket section 1b receiving the outer ring 2b and hub side relief section 2a of the hub 2. Further, the side surface of the pocket section 1b is formed with a pulley side relief section 1a in the circumferential direction. The pulley 1 and the hub 2 are connected by engagement of the pulley side relief section 1a and the hub side relief section 2a of the hub 2. Further, in the pocket section 1b, a plurality of reinforcing ribs 1c are provided in the circumferential direction at positions corresponding to the slits 2e on the hub side. When the pulley side relief section 1a and the hub side relief section 2a are engaged, the reinforcing ribs 1c and slits 2e engage. In the present embodiment, two projections 1a-1, 1a-2 of the pulley side relief section 1a are arranged between the reinforcing ribs 1c.

In the present embodiment, the hub 2 is integrally formed by insert molding of an inner hub 2c and outer ring 2b made of a metal material and a cylindrical part 2d and hub side relief section 2a made of an elastic material, that is, a plastic.

Figure 3:
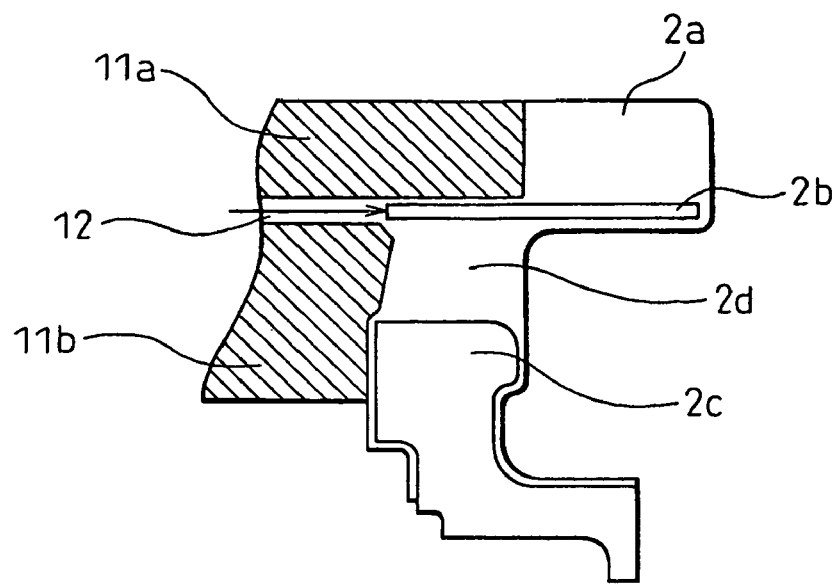
FIG. 3 is a view for explaining a gate for integrally molding a hub of a first embodiment.

FIG. 3 is a structural view of a mold showing a gate at the time of integral molding of a hub. At the time of molding, the inner hub 2c and outer ring 2b comprised of a metal material are arranged in the mold. Plastic is injected through the gates 12 arranged together with the mold 11a and mold 11b to integrally mold the cylindrical part 2d and hub side relief section 2a together with the inner hub 2c and the outer ring 2b. In the present embodiment, as shown in FIG. 3, the gates 12 are arranged near the end of the front surface of the outer ring 2b. The number of gates 12 is not particularly limited, but in the present embodiment, the gates 12 are provided at three locations at the front side of the hub.

After the molding is finished, the gates 12 are cut to obtain the integrally molded hub 2. At this time, as shown in FIG. 1, a gate mark 2f remains corresponding to the gate 12. As will be understood from FIG. 1, in the present embodiment, the gate marks 2f are formed further to the outer circumference side than the cylindrical part 2d and the bases of the gate marks 2f are enlarged in radii of curvature R so as to ease the stress concentration. Further, by forming the gate marks 2f near the outer ring 2b, the resistance to stress becomes higher. Note that the cross-sections of the gates are not limited to circles, but may also be rectangular and may also be any other shape.

Figure 4:
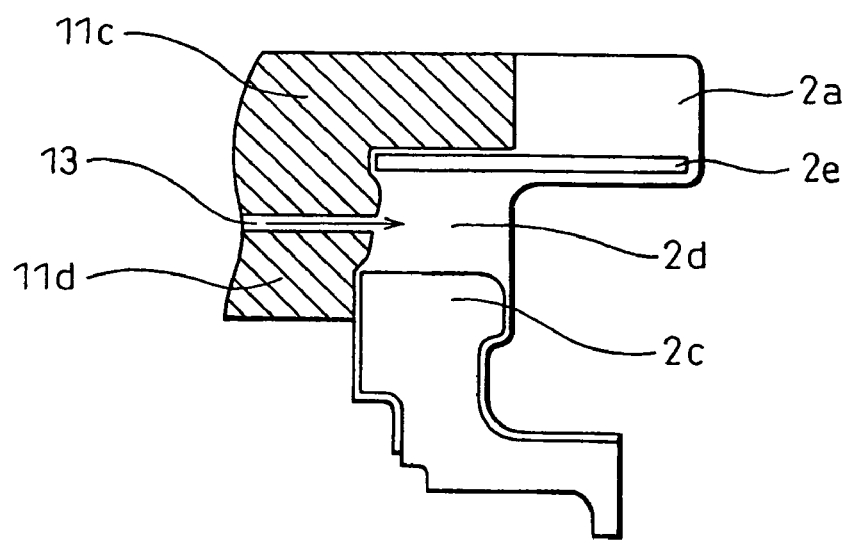
FIG. 4 is a view for explaining a gate for integrally molding a hub of a power transmission system of a comparative example.
Figure 5:
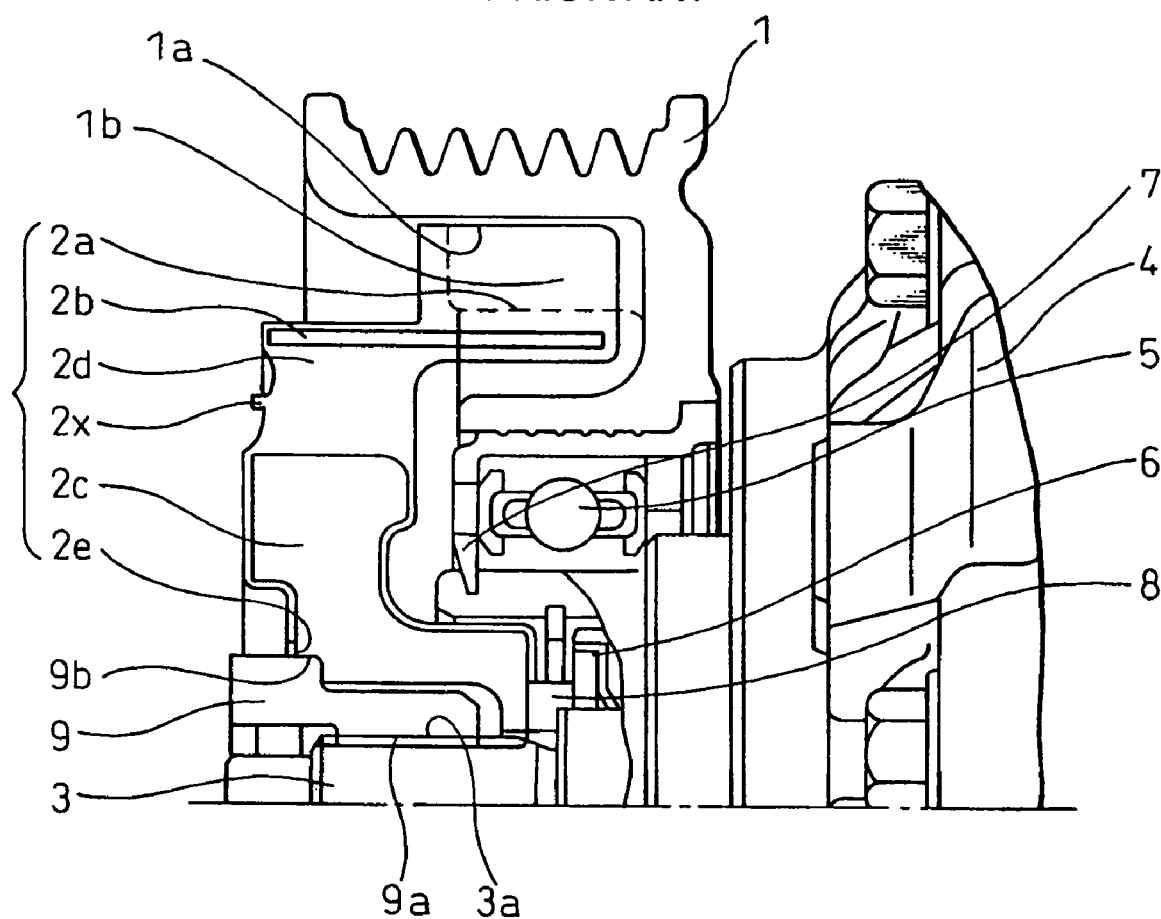
FIG. 5 is a view showing the cross-section of the top half of a power transmission system according to a comparative example.

Here, for comparison, the case of placing the gates at the center of the cylindrical part provided between the inner hub and the outer ring will be explained. FIG. 4 is a view of the structure of the mold when placing the gates at the center of the cylindrical part provided between the inner hub and outer ring for integral molding, while FIG. 5 is a cross-sectional view of the top half of the power transmission system of a comparative example using a hub integrally molded by the molds of FIG. 4. In FIG. 5, the power transmission system of the comparative example is the same as the present embodiment except for the gate marks 2x, so a detailed explanation of the comparative example will be omitted. Note that the same members are given the same reference notations.

Referring to the view of the mold structure of FIG. 4, the gates 13 are arranged together with the mold 11c and the mold 11d at the substantial center of the cylindrical part 2d. As will be understood from the shapes of the mold 11c and mold 11d corresponding to the cylindrical part 2d, the radii of curvature of the mold 11c and mold 11d near the gates 13 become smaller. If using this mold 11c and mold 11d to integrally mold the cylindrical part 2d and the hub side relief section 2a together with the inner hub 2c and outer ring 2b, as shown in FIG. 5, the bases of the gate marks 2x formed at the cylindrical part 2d become smaller in radii of curvature R. With this shape of the gate marks 2x, stress concentrates and is liable to lead to breakage of the cylindrical part 2d.

The gate marks 2f of the power transmission system of the present embodiment of FIGS. 1 and 2 are further to the outer circumference side compared with the gate marks 2x of the comparative example. Further, the bases of the gate marks 2f become larger in radii of curvature. In addition, there is the outer ring 2b near the bases, so the stress concentration is eased and there is therefore no longer any danger of distortion and breakage from the gate marks 2f.

Figure 6:
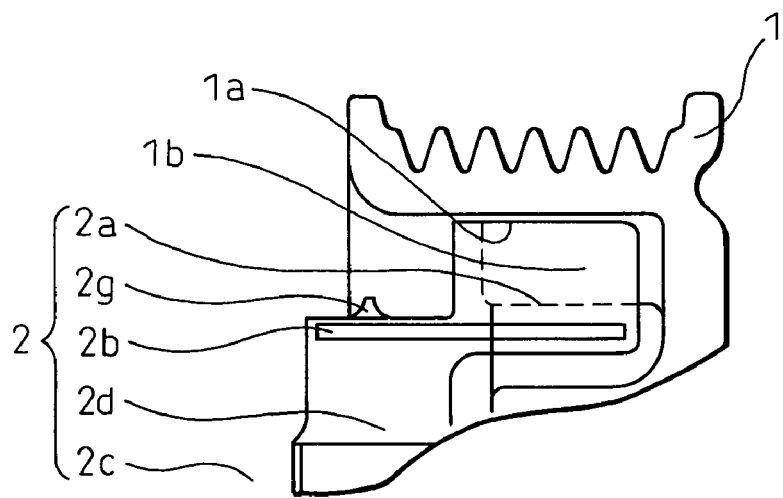
FIG. 6 is a partial cross-sectional view of a second embodiment of the present invention.

FIG. 6 is a partial cross-sectional view for explaining a second embodiment of the present invention. Members the same as in the first embodiment are assigned the same reference notations. In the second embodiment, the gates for integrally molding the hub 2 are arranged facing the outer circumference of the outer ring 2b. Plastic is injected from the gates whereby a hub side relief section 2a and gate marks 2g are formed at the outer circumference of the outer ring 2b of the integrally molded hub 2. The gate marks 2g remaining at the outer circumference of the outer ring 2b, like the gate marks 2f of the first embodiment, are formed further at the outer circumference side from the cylindrical part 2d, so the stress concentration can be eased. Further, there is the outer ring 2b near the gate marks 2f, so the resistance to stress is high.

Figure 7:
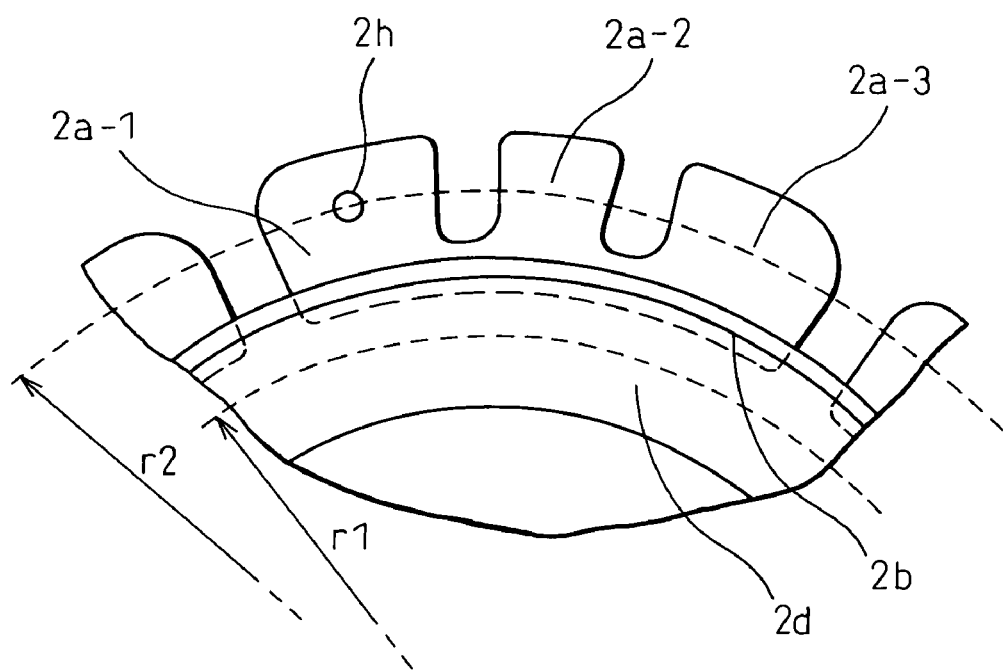
FIG. 7 is an enlarged partial view of a hub side relief section 2a and cylindrical part 2d for explaining a third embodiment of the present invention.

FIG. 7 is an enlarged partial view of the hub side relief section 2a and cylindrical part 2d for explaining the third embodiment of the present invention. The hub 2 rotates upon receiving power from the pulley 1 and transmits rotational force to the shaft 3 coaxial with the hub 2. The hub side relief section 2a formed at the outer circumference of the outer ring 2b is positioned at the outside from the cylindrical part 2d. That is, if considering the effective diameter of the distance from the center of the shaft 3, the relationship between the effective diameter r2 of the hub side relief section 2a and the effective diameter r1 of the cylindrical part 2d is r2>r1. When the hub rotates by a certain torque, the force applied to the hub side relief section 2a becomes smaller than the force applied to the cylindrical part 2d. Therefore, the hub side relief section 2a has a smaller stress of the elastic member than the cylindrical part 2d. For the above reasons, ensuring that the gate marks are present at the hub side relief section 2a further to the outer circumference from the vicinity of the outer ring 2b improves the durability. In the third embodiment, the gates at the time of integral molding of the hub 2 are arranged at positions corresponding to the hub side projections 2a-1 to 2a-3 forming parts of the hub side relief section 2a so that the gate marks 2h of the integrally molded hub 2 are formed at locations of the hub side projections 2a-1 to 2a-3. By doing this as well, deformation or breakage due to the concentration of stress at the gate mark can be prevented.

While the invention has been described with reference to specific embodiments chosen for purpose of illustration, it should be apparent that numerous modifications could be made thereto by those skilled in the art without departing from the basic concept and scope of the invention.

The invention claimed is:

1. A power transmission system provided with
a pulley rotatably attached to a casing and
a hub provided at a front end of a shaft projecting to the outside from said casing, wherein the hub rotates integrally with said shaft and transmits power from said pulley to said shaft, and wherein said hub is comprised of
an inner hub fastened to said shaft,
an outer ring arranged at an outer circumference side from said inner hub, and
a torque transmission elastic member integrally molded together with said inner hub and said outer ring, wherein the torque transmission elastic member is solid and fills a space between the inner hub and the outer ring, and
a gate mark, which is a protrusion and is a mark of an injection gate used for molding of the torque transmission elastic member, which is integrally molded with the outer ring, wherein the gate mark is located on the torque transmission elastic member, is made of the same material as the transmission elastic member, and is formed on a line extending from a front end of said outer ring.

2. The power transmission system as set forth in claim 1, wherein
said torque transmission elastic member is comprised of a cylindrical part between said inner hub and said outer ring and a hub side relief section provided at the outer circumference of said outer ring, and said pulley has a pulley side relief section engaging with said hub side relief section.

3. The power transmission system as set forth in claim 1, further provided with a torque limiter engaged with said shaft and cutting off transmission of excessive torque between said pulley and said shaft.

4. The power transmission system according to claim 1, wherein the torque transmission elastic member is located between the outer circumference of the inner hub and the inner circumference of said outer ring.

5. The power transmission system as set forth in claim 1, wherein the outer ring is embedded in the torque transmission elastic member.

6. The power transmission system as set forth in claim 1, wherein the outer ring is cylindrical, and the gate mark lies on an imaginary cylinder defined by the outer ring.

7. A power transmission apparatus comprising a pulley rotationally attached to a casing and a hub, which is located at a front end of a shaft, wherein the shaft projects from the casing, the hub rotates integrally with the shaft, the hub transmits power from the pulley to the shaft, and the hub includes an inner hub fastened to the shaft, an outer ring, which is located radially outward of the inner hub and at an outer peripheral part of the hub and, and a torque transmission elastic member, which is integrally molded together with the inner hub and the outer ring, is solid, and fills a space between the inner hub and the outer ring, and a gate mark, which is a protrusion and is a mark of a remainder of an injection gate used in the integral molding, wherein the gate mark is located on the torque transmission elastic member, is made of the same material as the transmission elastic member, is formed on a line extending from a metal surface that forms a front end of the outer ring, and protrudes generally in an axial direction away from the outer ring.

8. The power transmission apparatus as set forth in claim 7, wherein the outer ring is embedded in the torque transmission elastic member.

9. The power transmission system as set forth in claim 7, wherein the outer ring is cylindrical, and the gate mark lies on an imaginary cylinder defined by the outer ring.

* * * * *